Figure 1:
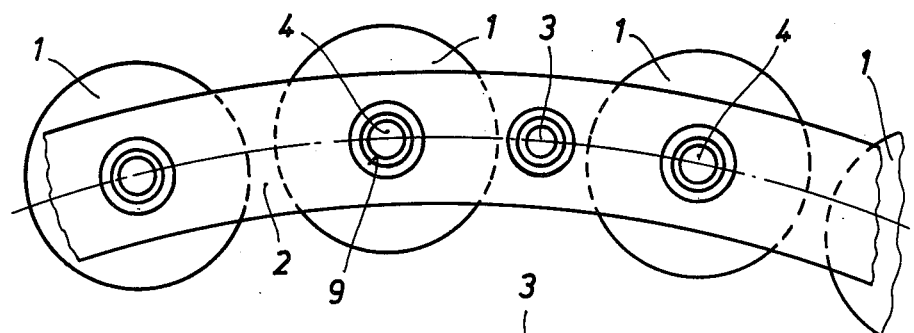

United States Patent [19]

Knappe

[11] 4,099,803
[45] Jul. 11, 1978

[54] ROLLER CARRIAGE FOR LARGER BEARINGS

[75] Inventor: Bernhard Knappe, Gochsheim, Fed. Rep. of Germany

[73] Assignee: Roland Kamm, Fed. Rep. of Germany

[21] Appl. No.: 772,827

[22] Filed: Feb. 28, 1977

[30] Foreign Application Priority Data

Feb. 28, 1976 [DE] Fed. Rep. of Germany ....... 2608308

[51] Int. Cl.² .................. F16C 33/34; F16C 33/52
[52] U.S. Cl. .................................. 308/215; 308/217
[58] Field of Search ............. 308/215, 217, 218, 207, 308/206, 235, 234, 226, 222, 20, DIG. 7, DIG. 8, 214, 213, 187, 212; 29/121.5, 121.6, 123, 125; 264/263

[56] References Cited

U.S. PATENT DOCUMENTS

| 365,506 | 6/1887 | Dean | 308/215 |
| 2,096,321 | 10/1937 | Cox | 308/214 |
| 2,977,164 | 3/1961 | Witte | 308/217 |
| 3,963,285 | 6/1976 | Kellstrom | 308/217 X |

Primary Examiner—Trygve M. Blix
Assistant Examiner—Douglas C. Butler
Attorney, Agent, or Firm—Holman & Stern

[57] ABSTRACT

A roller carriage for larger bearings having a plurality of rollers each of which is provided with recesses in both end areas, and a cage comprising two cage-ring sections which are provided with boreholes, the cage-ring sections being connected with spacer bolts, pins are inserted into the boreholes of the cage-ring sections with the pins extending into the recesses of the rollers. The portion of the pin which extends into the recess of the roller is provided with a convex projection being concentric with the pin serving for axial guidance of the roller, while the radial guidance is provided by the contact between the cylindrical surface of the pin and the borehole inner cylindrical surface of the recess.

4 Claims, 3 Drawing Figures

ROLLER CARRIAGE FOR LARGER BEARINGS

The instant invention concerns a roller carriage for larger bearings having a plurality of rollers which are provided with recesses in both end areas, and a cage comprising two cage-ring sections which are provided with boreholes, the cage-ring sections being connected with spacer bolts, whereby pins are inserted into boreholes of the cage-ring sections, the pins extending into the recesses of the rollers.

In a prior art (German Pat. No. 317,057) roller carriage, the radial and axial guidance takes place over folded-in pins of the cage at a single point, which results in high specific loads and high heat-development. Additionally, the rigidity of this metal sheet with good bend properties is insufficient for larger bearings. The folded-in pins become thereby easily loosened, especially during a mechanical operation.

There is also known in the prior art a roller bearing (U.S. Pat. No. 2,096,321) in which the small end portions of the rollers are provided with a spherical recess which is coaxial to the roller-axis. The spherical end of a pin reaches into the recess which is fastened in a solid tin-plated window-cage. The purpose of this is to provide only a structural unit; i.e., the pin has the purpose of securing the roller in the tin-plated window cage against falling out of the same. The individual rollers are retained at a distance from each other and are guided by means of cross-pieces. The disadvantage of this arrangement is that it is impossible to form a constant lubrication film between rollers and passage, since the lubrication film is stripped off by the cross piece onto which the roller runs. The result is poor lubrication, since the cross-piece cages develop sharp edges during operation. The wear of the roller surface area is additionally increased by the roller running up onto the cage cross-pieces. Additionally, compressive forces are developed when the roller tries to underrun a cage cross-piece.

Also known in the prior art is a roller carriage having a structural unit (U.S. Pat. No. 1,250,595) in which the rollers are retained in the cage by projections which extend into the recesses of the rollers. In this device, the rollers are retained in spaced-apart positions by means of cross-pieces, thus producing the same disadvantage of interference in the lubrication film coating on the roller. Finally, such types of roller carriages are either not very precise, or are very costly to manufacture.

It is therefore the scope of the instant invention to produce a roller carriage of the type mentioned at the beginning, which does not have the above-mentioned disadvantages, namely, a roller carriage which guarantees a safe and precise cage-guidance, and thereby avoids high specific stresses and high heat-development at the points of contact between cage and roller, and enables a constant lubricating film between rollers and path-way, and, in addition, is not subjected to compression forces, has sufficient precision, and is economical in its manufacture.

The instant invention proposes a roller carriage, wherein the portion of the pin which reaches into the recess of the roller is provided with a convex projection being concentric to the pin, which projection serves for the axial guidance, while the radial guidance takes place between the cylindrical surface of the pin and the borehole inner cylindrical surface of the recess of the rollers.

Due to the radial and the axial cage-guidance taking place at two different points in the roller-recess, namely, the axial guidance on the convex projection of the pin and the radial guidance on the pin cylindrical surface, the specific stress and the heat-development are substantially decreased. This is especially true for bearings which are mounted with a vertical bearing axis, since the entire cage-weight is hereby transmitted at the point of contact of pin/depression, while the radial forces, which develop as a result of the varying speeds of the rollers, are received on the cylindrical surface of the pin and the roller-recess. Of especial advantage has proven to be the embodiment in which the radius of the convex pin-projection is about 1/10 of the radius of a depression in the roller-recess. In this case, such type of roller carriages can be manufactured very economically, with sufficient precision. The inventive roller carriage consists of easily-manufactured sections, it can be mounted without difficulty and it is operationally safe and inexpensive.

Figure 2:
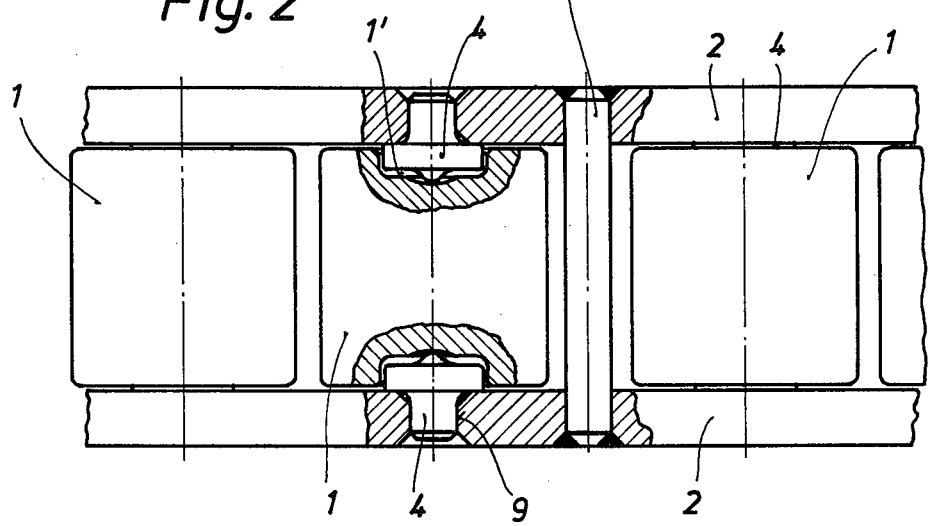
Figure 3:
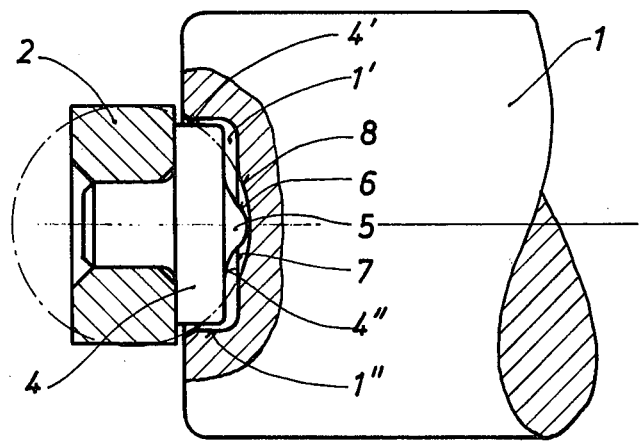

Further characteristics of the instant invention can be seen from the claims and the drawings. A preferred embodiment of the instant invention is seen in the drawing, whereby FIG. 1 illustrates a side-elevational view of a portion of a roller carriage according to the present invention;

FIG. 2 represents a top view of the roller carriage, according to FIG. 1, with a partial cross-sectional view; and FIG. 3 shows a partial end-cross-sectional view of a cage guiding point of the roller carriage according to FIGS. 1 and 2, in an enlarged dimension in comparison to FIGS. 1 and 2.

A roller carriage according to the present invention comprises rollers 1, two cage-ring sections 2, connecting spacer-bolts 3 and pins 4. A recess 1' is provided on the two end portions of each roller 1 which forms an inner cylindrical surface portion 1" being coaxial with the axis of the roller. Each pin 4 is provided with a cylindrical surface 4' and a frontal portion 4".

The pins 4 are inserted into the boreholes 9 of the cage-ring sections 2 in a manner so that they are unable to fall out by themselves during the mounting of the roller carriage. A further fastening of the pins 4 in the boreholes 9 of the cage-ring sections 2 is not necessary, since the pins are retained in the cage-ring sections 2 by means of the rollers 1, in the assembled condition of the roller carriage.

The cage-ring sections 2 are spaced apart along circumference by only four spacer bolts 3, so that as many rollers 1 can be mounted on the partial circumference as possible, thereby obtaining a high load-capacity. Preferably, the spacer-bolts 3, which are fixedly inserted into the boreholes of the cage-ring sections 2, are secured by means of welding, after axial cage-play has been provided by means of a void. In some cases, in which, for example, a dismountable cage is desired, the securing measure is made by a different means.

As can be seen from FIG. 3, the pin 4 is provided, on its frontal portion 4" which faces the roller 1, with a concentric convex projection 5, which extends into the recess 1' of the roller 1. This recess 1' comprises, preferably, a cylindrical pocket borehole, which is provided with a depression 7 which is concentrical to the roller axis.

The ratios of play are selected so that the axial and the radial cage-guidance are made separately, thereby producing a substantial reduction of the potential stress and heat-development, and excluding any compressive forces. Thus, the forces which are unavoidably developed during operation and which are produced by the slanted positioning of the rollers, are not carried by the cage but exclusively by the bearing edges.

The cage transmits the forces, which are caused by the cage-weight and the centrifugal force, axially via the pin 4, the convex projection 5 and the depression 7, onto the roller 1, while the radial cage-guidance takes place between the inner cylindrical surface portion 1" of recess 1' and the cylindrical surface 4' of the pin 4 reaching into the pocket borehole recess 1'. This arrangement, in comparison to other types of cages, will, to a great extent, prevent a slip of the rollers 1 in the unstressed area, since the rollers 1 are positioned frictionlessly with their recesses 1' on the pins 4.

The pin 4 is preferably manufactured of a synthetic material, having the cylindrical surface 4' and the convex projection 5 with a spherical radius 6 at the frontal portion 4". Spray-molding is one of the preferable methods of manufacture. The pin 4, which is manufactured in a mass-production manner, is economical and easy to install. It is inserted into the boreholes 9 of the cage-ring sections 2 in the same manner as the spacer bolts 3, whereby the latter are welded from the outside. The recess 1' of the roller can be produced easily, and the depression 7, for example, is produced with a spherical radius 8 which is indicated by a broken line in FIG. 3. It is advantageous to select the radius 8 so that the edge of the recess 1' is chamfered. The most preferred ratio of the spherical radius 6 of the projection 5 to the radius 8 of the depression 7 is approximately 1/10.

What I claim is:

1. A roller carriage for larger bearings comprising a number of rollers having end portions and having recesses each with an inner cylindrical surface portion, said recesses being on the end portions of each roller, a cage which comprises two cage-ring sections which are provided with boreholes, spacer bolts connecting said cage-ring sections with one another, and pins inserted into the boreholes of the cage-ring sections, said pins inserted into the boreholes of the cage-ring sections, said pins extending into the recesses of the rollers, the portion of each one of said pins which extends into one of the recesses of one of the rollers has a frontal portion which faces the roller and a cylindrical surface with a radius and is provided with a convex projection which is concentric to said one pin; said projection has a radius and serves for axial guidance of said roller, while radial guidance of said roller is made between the cylindrical surface of said one pin and the inner cylindrical surface portion of said one recess of said one rollers, each of said recesses of the rollers comprises a cylindrical pocket borehole which is provided with a spherical depression concentric to the roller axis in which said convex projection rests and said radius of said projection is less than the radius of said cylindrical surface.

2. The roller carriage according to claim 1, wherein said convex projection has a spherical radius, said depression has a spherical radius and the radius of the projection is approximately 1/10 of the spherical radius of the depression in said recess of said roller.

3. The roller carriage according to claim 2 wherein the pins are manufactured of a wear-resistant synthetic material.

4. The roller carriage according to claim 1 wherein the pins are manufactured of a wear-resistant synthetic material.

* * * * *